United States Patent
Imamura (10) Patent No.: US 7,023,711 B2
(45) Date of Patent: Apr. 4, 2006

(54) POWER SUPPLY CIRCUIT AND ELECTRONIC APPARATUS

(75) Inventor: Noritoshi Imamura, Miyagi (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/895,826

(22) Filed: Jul. 22, 2004

(65) Prior Publication Data

US 2005/0117371 A1 Jun. 2, 2005

(30) Foreign Application Priority Data

Jul. 24, 2003 (JP) ............................ P2003-279352

(51) Int. Cl.
*H02M 3/335* (2006.01)
(52) U.S. Cl. .................................. 363/21.18
(58) Field of Classification Search ............. 363/21.02, 363/21.18, 21.01, 20, 131
See application file for complete search history.

(56) References Cited

U.S. PATENT DOCUMENTS

| | | | |
|---|---|---|---|
| 6,005,780 A | 12/1999 | Hua | |
| 6,088,242 A | 7/2000 | Koegel et al. | |
| 6,496,389 B1 * | 12/2002 | Yasumura | ................ 363/21.04 |

FOREIGN PATENT DOCUMENTS

| | | |
|---|---|---|
| EP | 0673106 A1 | 9/1995 |
| JP | 2000-351250 | 12/2000 |

* cited by examiner

*Primary Examiner*—Shawn Riley
(74) *Attorney, Agent, or Firm*—Rader, Fishman & Grauer PLLC; Ronald P. Kananen (57) ABSTRACT

The object of the present invention is to improve the power factor and at the same time to obtain a high efficient operation. It is constituted such that one terminal of a DC power supply 12 from which a pulsating flow is obtained is connected to a connection mid point of one terminal of a primary winding 15a and the other terminal of an auxiliary winding 15c wound in phase on a converter transformer 15 by means of a series circuit of a choke coil 13 and a first diode 14; one terminal of the auxiliary winding 15c of the converter transformer 15 is connected to the other terminal of the DC power supply 12 through a first capacitor 16 and at the same time the other terminal of the primary winding 15a is connected to the other terminal of the DC power supply 12 through a switching device 17; a secondary winding 15b wound in counter phase with the primary winding 15a for the converter transformer 15 is connected to a DC voltage output terminal 19a, 19b through a rectifying circuit 18; the DC voltage output terminal 19a is connected to an input side of a pulse width modulation control circuit 20; and an output terminal of the pulse width modulation circuit 20 is connected to a control electrode of the switching device 17.

3 Claims, 7 Drawing Sheets

POWER SUPPLY CIRCUIT AND ELECTRONIC APPARATUS

BACKGROUND OF THE INVENTION

1. Field of the Invention

The present invention relates to a power supply circuit which can be made to supply a relatively large electric power and to an electronic apparatus which uses a relatively large electric power.

2. Description of the Related Art

Figure 1:
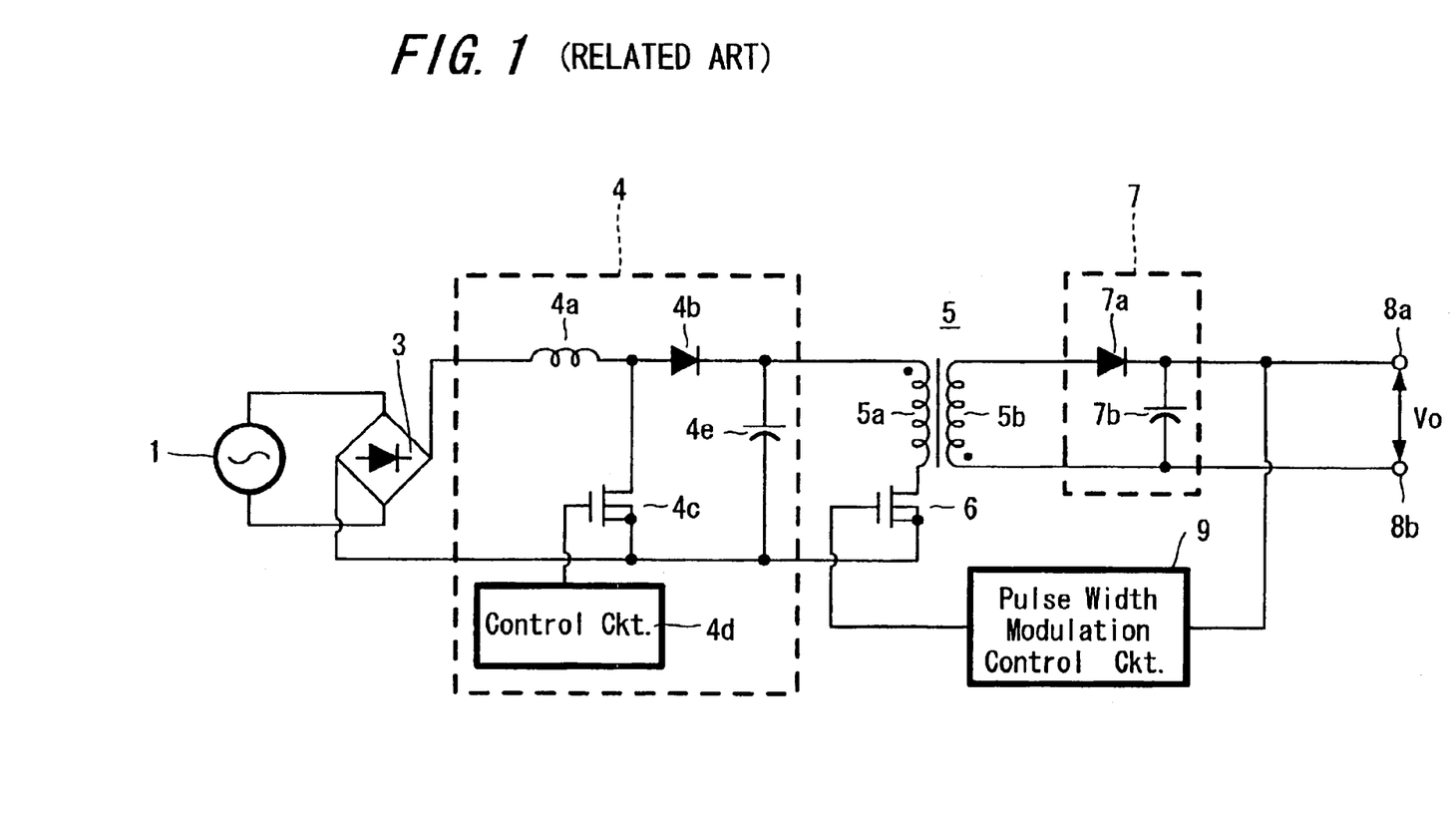
FIG. 1 is a constitutional diagram showing an example of a conventional power supply circuit.

Heretofore, a circuit such as shown in FIG. 1 has been proposed as a switching type power supply circuit which can supply a relatively large electric power, for example, 100 W (see patent reference 1). The power supply circuit of FIG. 1 is a circuit added with a power factor improving circuit (PFC circuit) in accordance with a higher harmonic wave regulation.

In FIG. 1, a reference numeral 1 designates a commercial power supply of, for example, 100V and 50 Hz, and one terminal and the other terminal of the commercial power supply 1 are connected to one terminal and the other terminal on the input side of a rectifying circuit 3 of a diode bridge constitution respectively.

A pulsating flow of a positive direction corresponding to the frequency of the commercial power supply 1 is obtained at the positive-polarity terminal and negative-polarity terminal on the output side of the rectifying circuit 3. The positive-polarity terminal on the output side of the rectifying circuit 3 is connected to one terminal of a primary winding 5a of a converter transformer 5 by means of a series circuit of a choke coil 4a and a diode 4b which forms a power factor improving circuit 4, the other terminal of the primary winding 5a is connected to the drain of a field effect transistor 6 which constitutes a switching device, and the source of the field effect transistor 6 is connected to the negative-polarity terminal on the output side of the rectifying circuit 3.

It is constituted such that a connection mid point of the choke coil 4a and the diode 4b is connected to the drain of the field effect transistor 4c which forms the power factor improving circuit 4, the source of the field effect transistor 4c is connected to the negative-polarity terminal of the rectifying circuit 3, and a switching signal from a control circuit 4d is supplied to the gate of the field effect transistor 4c. In addition, a connection mid point of the diode 4b and one terminal of the primary winding 5a is connected to the negative-polarity terminal of the rectifying circuit 3 through a capacitor 4e which forms the power factor improving circuit 4.

The power factor improving circuit 4 is to make the pulsating flow obtained on the output side of the rectifying circuit 3 be sine-wave shaped and supplies it to the primary winding 5a of the converter transformer 5.

Also, one terminal of a secondary winding 5b wound in counter phase with respect to the primary winding 5a of the converter transformer 5 is connected to one DC voltage output terminal 8a through a diode 7a forming a rectifying circuit 7, a connection mid point of the diode 7a and the one DC voltage output terminal 8a is connected the other terminal of the secondary winding 5b through a smoothing capacitor 7b forming the rectifying circuit 7, and the other terminal of the secondary winding 5b is connected to the other DC voltage output terminal 8b.

The one DC voltage output terminal 8a is connected to the input side of a pulse width modulation control circuit 9 composed of a semiconductor integrated circuit, a switching signal of a pulse width modulation signal obtained on the output side of the pulse width modulation control circuit 9 is supplied to the gate of a field effect transistor 6 and the field effect transistor 6 is switched by the switching signal of the pulse width modulation signal such that a constant DC voltage $V_0$ is obtained at the one and the other DC voltage output terminals 8a and 8b.

In such a power supply circuit shown in FIG. 1, the power factor is improved by carrying out control for making the input pulsating flow current from the rectifying circuit 3 be sine-wave shaped by means of the power factor improving circuit 4. In this case, the power factor is a power factor cos φ and expressed as a following equation when the input power is made to be |W|, the input current to be |A| and the input voltage to be |V|:

$$\cos \phi = |W|/(|A| \times |V|)$$

When the power factor improving circuit 4 such as shown in FIG. 1 is provided, the power factor cos φ can be improved as much as 0.8 to 0.99 and the input current waveform is made approximated to the input voltage waveform.

[Cited Patent Reference 1] Jap. Laid-open Patent No. 11-164555

However, when the power factor improving circuit 4 is provided in a conventional switching type power supply circuit, the efficiency of the power factor improving circuit 4 is to be integrated or multiplied to the efficiency of the power supply circuit, so that the efficiency decreases. For example, even if the efficiency of the conventional switching type power supply circuit is 90% and the converting efficiency of the power factor improving circuit 4 is 90%, the total efficiency will come to be 81%.

In addition, the power factor improving circuit 4 switches a large current by the field effect transistor 4c, so that there is a disadvantage that it becomes a noise generating source.

Further, since the power factor improving circuit 4 is provided, the circuit becomes complicated as much as the power factor improving circuit 4 and at the same time a space for mounting-the power factor improving circuit 4 becomes necessary, so that there was a disadvantage that the cost became higher as much.

SUMMARY OF THE INVENTION

In view of aforesaid aspect, an object of the present invention is to improve the power factor and also to make the efficiency thereof high in a simple constitution particularly without providing a power factor improving circuit.

According to one example of the present invention, there is provided a power supply circuit comprising a series circuit of a choke coil connected to one terminal of a DC power supply from which a pulsating flow is obtained and a first diode; a converter transformer having a primary winding, an auxiliary winding which is serially connected to the primary winding and wound in phase therewith and a second winding which is wound in counter phase with the primary winding; a pulse width modulation control circuit; and a first capacitor, wherein the one terminal of the DC power supply is connected to a connection mid point of the primary winding and the auxiliary winding of aforesaid converter transformer by means of the series circuit of the choke coil and the first diode, one terminal of the auxiliary winding of the converter transformer is connected to the other terminal of the DC power supply through aforesaid first capacitor and at the same time the other terminal of the primary winding is connected to the other terminal of the DC power supply through a switching device, the secondary winding of the converter transformer is connected to a DC voltage output terminal through a rectifying circuit, the DC voltage output terminal is connected to an input side of the pulse width modulation control circuit, and an output terminal of the pulse width modulation circuit is connected to a control electrode of the switching device.

According to the present invention, the input current will flow in response to -the pulsating flow change of the input voltage, the input current waveform is to be approximated to the input voltage and the envelope of the current switched by a high frequency becomes a waveform analogous to the pulsating flow voltage of the input voltage, so that the power factor is improved.

In addition, according to the present invention, a switching type power supply circuit of high efficiency can be obtained owing to a fact that there is no constitution for lowering the efficiency.

According to the present invention, the power factor is improved and a high efficient and a small-sized power supply circuit can be obtained where the efficiency is not lowered owing to a fact that a power factor improving circuit is not particularly provided.

In addition, in an electronic apparatus using a power supply circuit according to the present invention, power saving and also miniaturization of the electronic apparatus can be achieved, because the power supply circuit is highly efficient and also small-sized.

DESCRIPTION OF THE PREFERRED EMBODIMENTS

Hereinafter, examples of the best mode for carrying out the power supply circuit according to the present invention will be explained with reference to drawings.

Figure 2:
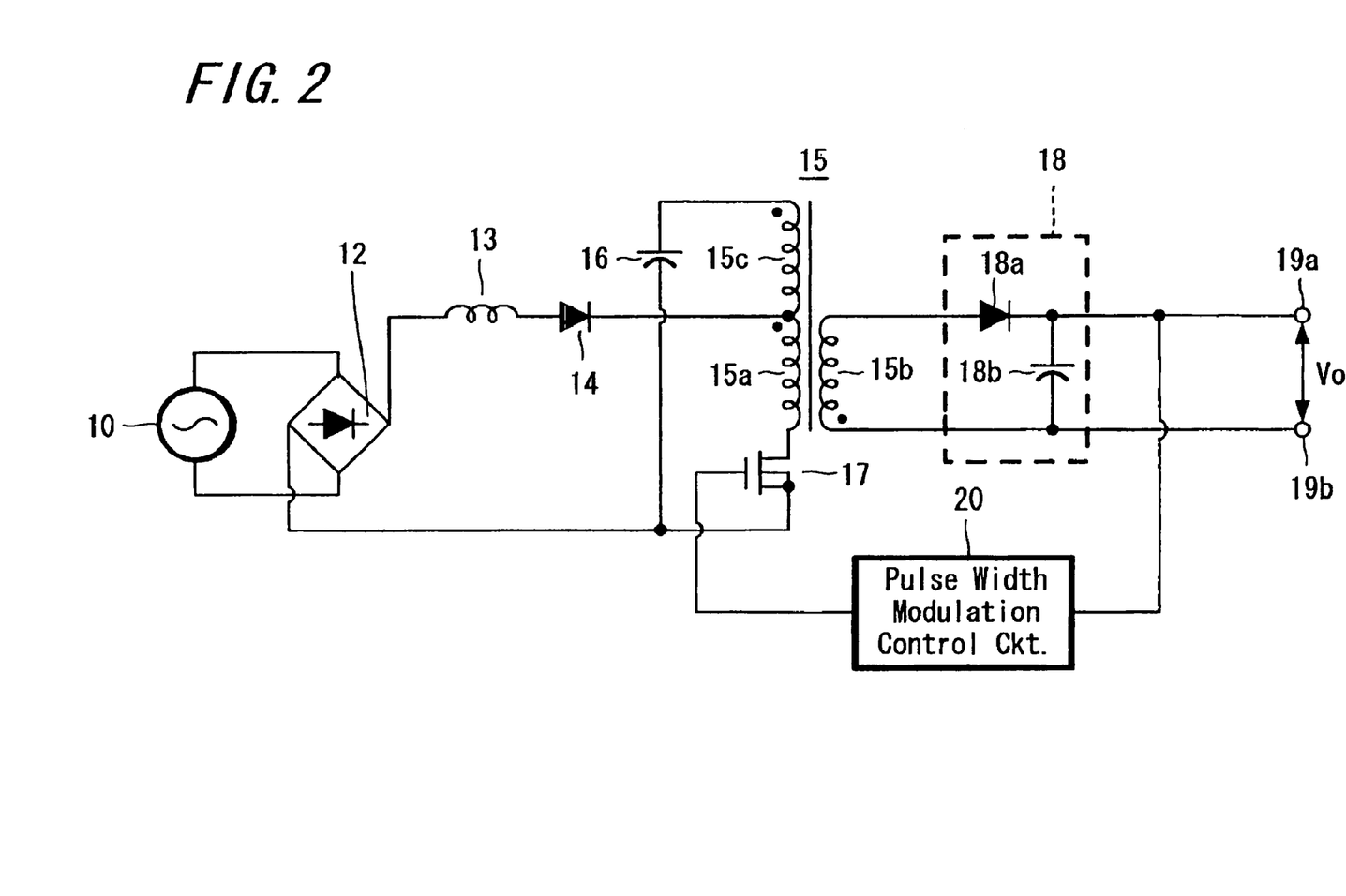
FIG. 2 is a constitutional diagram showing an example of an exemplified embodiment according to a power supply circuit of the present invention.

FIG. 2 shows a power supply circuit according to an example of the present. In this FIG. 2, a reference numeral 10 designates a commercial power supply of, for example, 100V and 50 Hz, and one terminal and the other terminal of the commercial power supply 10 are connected to one terminal and the other terminal on the input side of a rectifying circuit 12 of a diode bridge constitution respectively.

A sine wave shaped pulsating flow of a positive direction corresponding to the frequency of the commercial power supply 10 is obtained between a positive polarity terminal and a negative polarity terminal of the output side of the rectifying circuit 12. The positive polarity terminal of the output side of the rectifying circuit 12 is connected to the anode of a diode 14 through a high frequency blocking choke coil 13 and the cathode of the diode 14 is connected to a connection mid point of one terminal of a primary winding 15a and the other terminal of an auxiliary coil 15c wound in phase on a converter transformer 15.

One terminal of the auxiliary coil 15c is connected to the negative polarity terminal of the rectifying circuit 12 through a capacitor 16. In addition, the other terminal of the primary winding 15a is connected to the drain of a field effect transistor 17 forming a switching device and the source of the field effect transistor 17 is connected to the negative polarity terminal of the rectifying circuit 12.

Further, one terminal of a secondary winding 15b wound in counter phase with respect to the primary winding 15a of the converter transformer 15 is connected to the anode of a diode 18a forming a rectifying circuit 18, the cathode of the diode 18a is connected to one DC voltage output terminal 19a, a connection mid point of the diode 18a and the one DC voltage output terminal 19a is connected to the other terminal of the secondary winding 15b through a smoothing capacitor 18b forming the rectifying circuit 18, and the other terminal of the secondary winding 15b is connected to the other DC voltage output terminal 19b.

This one DC output terminal 19a is connected to the input side of a pulse width modulation circuit 20 composed of a semiconductor integrated circuit, a switching signal of a pulse width modulation signal corresponding to an output DC voltage $V_0$ obtained on the output side of the pulse width modulation circuit 20 is supplied to the gate of the field effect transistor 17 and the field effect transistor 17 is switched by the switching signal of the pulse width modulation signal such that a constant DC voltage $V_0$ is obtained between the one and the other DC voltage output terminals 19a and 19b.

In this case, the frequency of the switching signal is made to be extremely high compared with the frequency of the commercial power supply.

Figure 3:
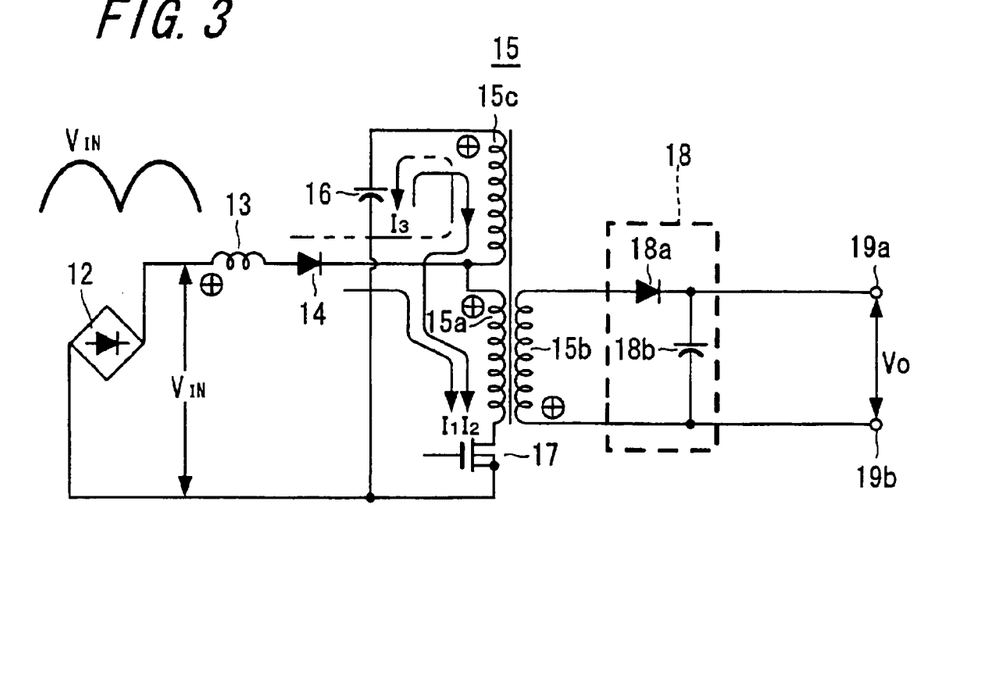
FIG. 3 is a diagram to be used for explaining FIG. 2.

In the power supply circuit shown in this FIG. 2, each of the polarity of the electromotive force and the flow of the current with respect to the choke coil 13, the primary winding 15a of the converter transformer 15, the secondary winding 15b and the auxiliary coil 15c when the field effect transistor 17 is ON is shown in FIG. 3.

To explain about FIG. 3, the input voltage $V_{IN}$ of the output from the rectifying circuit 12 is a pulsating flow voltage obtained by full-wave rectifying the sine wave of the commercial power supply.

Consequently, when the field effect transistor 17 is ON, a current $I_3$ flows in a route of the positive polarity terminal of the rectifying circuit 12→the choke coil 13→the diode 14→the auxiliary coil 15c→the capacitor 16→the negative polarity terminal of the rectifying circuit 12 during a period when the following formula (1) is satisfied:

the input voltage $V_{IN}$+the electromotive force $V_{N2}$ of the auxiliary coil 15c>the electric potential $V_{C1}$ of the capacitor 16     (1)

In addition, during a period when $V_{IN}+V_{N2}<V_{C1}$ which is the reverse relation with respect to the formula (1) is satisfied, a discharge current $I_2$ from the capacitor 16 flows in a route of the capacitor 16→the auxiliary coil 15c→the primary winding 15a→the field effect transistor 17→the capacitor 16.

Further, after the field effect transistor 17 is turned on, a current $I_1$ flows in a route of the positive polarity terminal of the rectifying circuit 12→the choke coil 13→the diode 14→ the primary winding 15a→the field effect transistor 17→the negative polarity terminal of the rectifying circuit 12.

When the field effect transistor 17 is in an ON state, the rectifying diode 18a on the secondary side of the converter transformer 15 lies in an OFF state and energy will be stored in the converter transformer 15 by means of the current $I_1+I_2$ on the primary side of the converter transformer 15.

Figure 4:
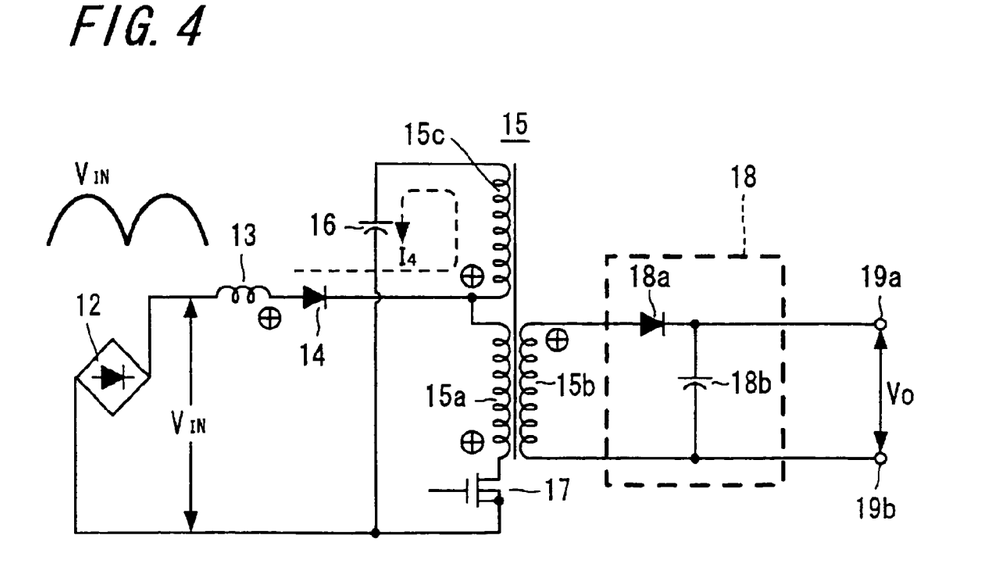
FIG. 4 is a diagram to be used for explaining FIG. 2.

In the power supply circuit shown in this FIG. 2, each of the polarity of the electromotive force and the flow of the current with respect to the choke coil 13, the primary winding 15a of the converter transformer 15, the secondary winding 15b and the auxiliary coil 15c when the field effect transistor 17 is OFF is shown in FIG. 4.

To explain about FIG. 4, when the field effect transistor 17 is OFF, a current $I_4$ flows in a route of the positive polarity terminal of the rectifying circuit 12→the choke coil 13→the diode 14→the auxiliary coil 15c→the capacitor 16→the negative polarity terminal of the rectifying circuit 12 so as to supply energy to the capacitor 16 during a period when the following formula (2) is satisfied:

$$V_{IN}+\text{reverse electromotive force } V_{L1} \text{ of the choke coil } 13 > V_{C1} \quad (2)$$

In this case, the switching frequency of the field effect transistor 17 is a far higher frequency than the frequency of the commercial power supply of the input pulsating flow voltage $V_{IN}$, for example, 50 Hz, and the conduction angle of the current for supplying energy to the capacitor 16 can be made to be wide by selecting the function of the choke coil 13 and by setting the number of turns with respect to the primary winding 15a, the secondary winding 15b and the auxiliary coil 15c of the converter transformer 15.

In addition, the period for charging the capacitor 16 is during when the electromotive force $V_{N2}$ of the auxiliary coil 15c is superposed to the pulsating flow voltage $V_{IN}$ of the input voltage in a case when the field effect transistor 17 is ON and it is during when the reverse electromotive force $V_{L1}$ of the choke coil 13 is superposed to the pulsating flow voltage $V_{IN}$ of the input voltage in a case when the field effect transistor 17 is OFF.

Therefore, the input current comes to flow corresponding to the pulsating flow change of the input voltage $V_{IN}$ and the input current waveform comes to be approximated to the input voltage $V_{IN}$ waveform. Consequently, the current envelope switched by the high frequency becomes an analogous waveform to the pulsating flow voltage $V_{IN}$ of the input voltage and the power factor cos φ is to be improved. According to the example of the present invention, the power factor cos φ is in a range of 0.87 to 0.95.

As mentioned above, according to the power supply circuit of the example of the present invention, the improvement of the power factor can be automatically carried out by controlling so as to obtain a constant output DC voltage $V_0$.

In addition, according to the example of the present invention, a power factor improving circuit need not to be particularly provided such as in a conventional way so that a power supply circuit of a high efficiency can be obtained without lowering the efficiency and it is possible to achieve making a power saving thereof.

Figure 8:
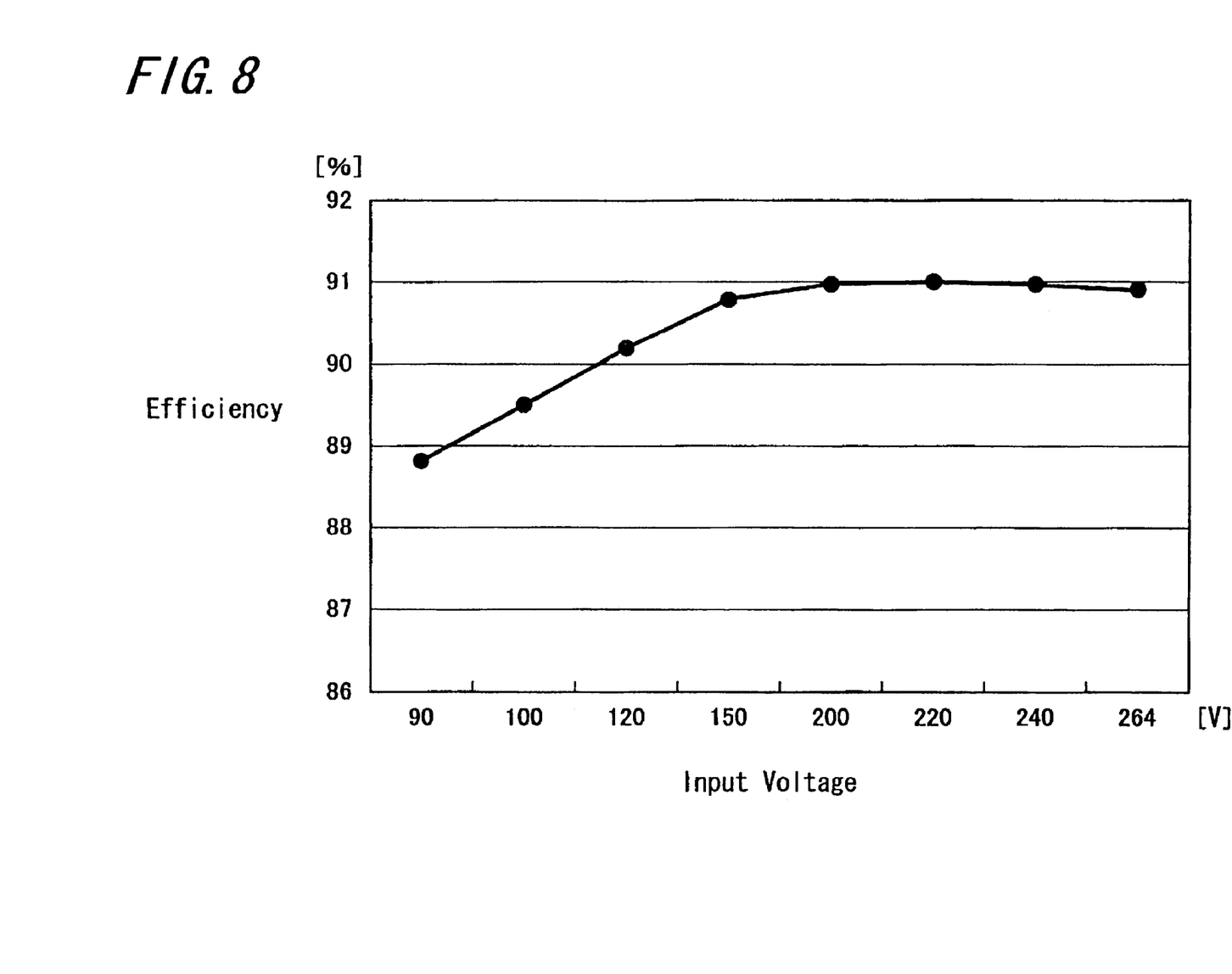
FIG. 8 is a diagram to be used for explaining the present invention.
Figure 9:
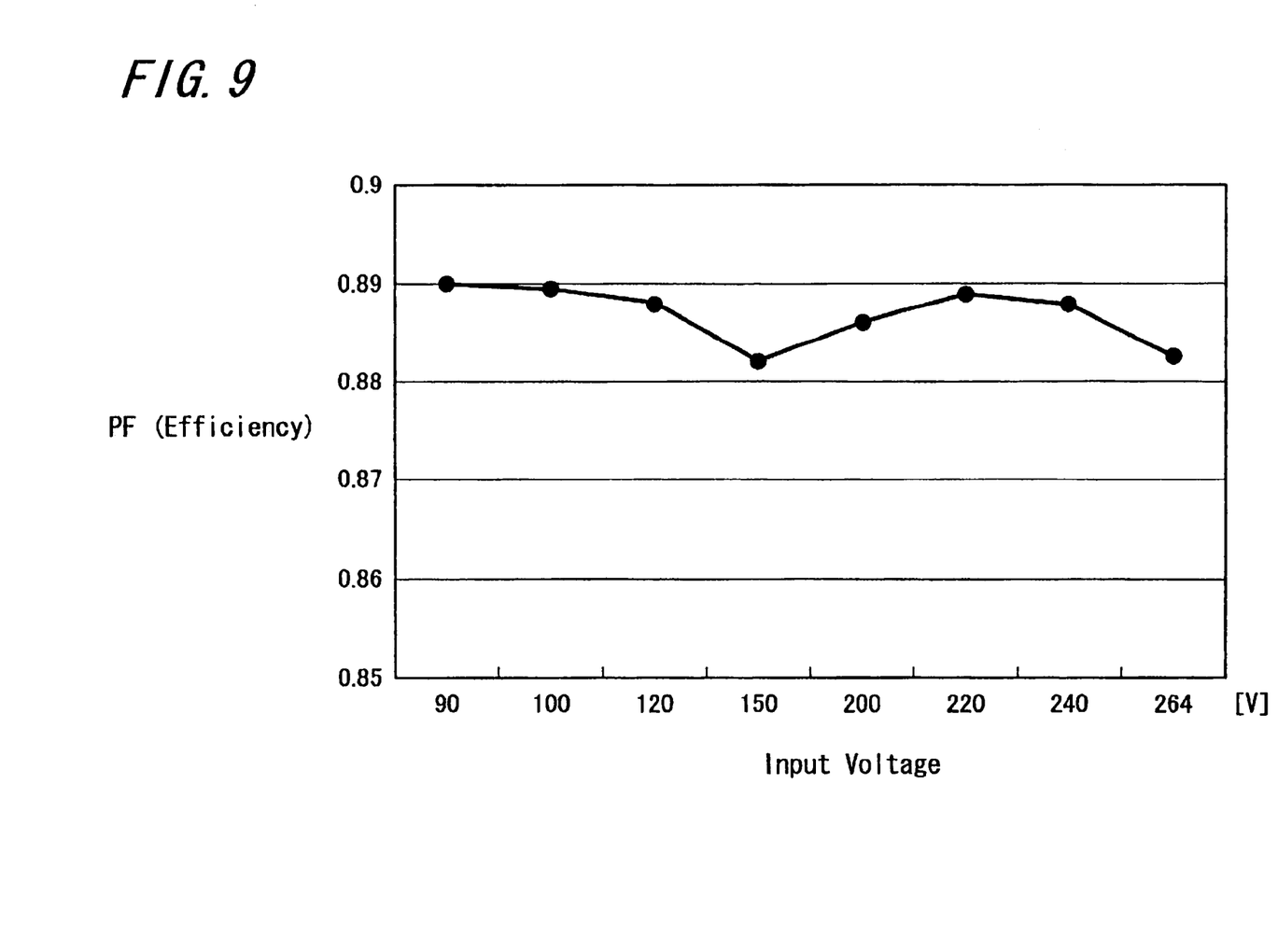
FIG. 9 is a diagram to be used for explaining the present invention.

In this connection, examples of experiment data for the relations of the efficiency and the power factor (PF) relative to the input voltage of 90V to 264 V, 50 Hz as the commercial power supply 10 according to the example of the present invention are respectively shown in FIG. 8 and in FIG. 9. FIG. 8 shows data of the efficiency relative to the input voltage when the voltage 20V and the current 5 A (100 W) are outputted, and FIG. 9 shows data of the power factor (PF) relative to the input voltage when the voltage 20V and the current 5 A (100 W) are outputted.

Figure 5:
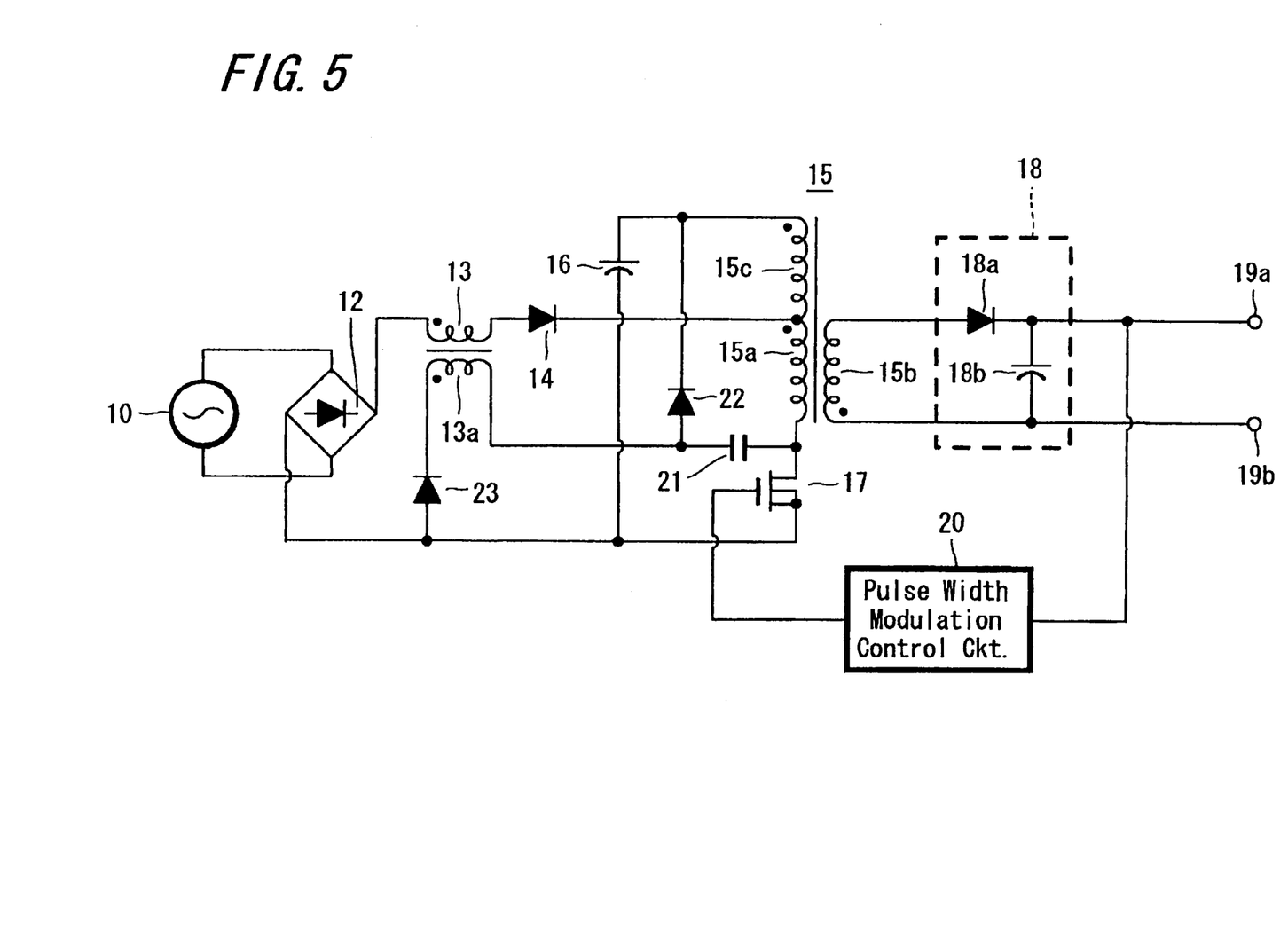
FIG. 5 is a constitutional diagram showing another example of an exemplified embodiment according to the present invention.

FIG. 5 shows another example of an exemplified embodiment according to the present invention. The example of FIG. 5 shows an example where higher efficiency making is achieved moreover in the example of FIG. 2. To explain the example of FIG. 5, same reference numerals are put for portions in FIG. 5 corresponding to those in FIG. 2 such that overlapped explanation thereof will be omitted.

In the example of FIG. 5, a connection mid point of the primary winding 15a of the converter transformer 15 and the drain of the field effect transistor 17 is connected to the anode of a diode 22 through a capacitor 21 and the cathode of the diode 22 is connected to a connection mid point of the capacitor 16 and the auxiliary coil 15c.

Also, the negative polarity terminal of the rectifying circuit 12 is connected to the anode of a diode 23 and the cathode of the diode 23 is connected to a connection mid point of the capacitor 21 and the diode 22 by means of a coupling coil 13 a wound in phase on the choke coil 13. Other portions are constituted similarly as those in FIG. 2.

Figure 6:
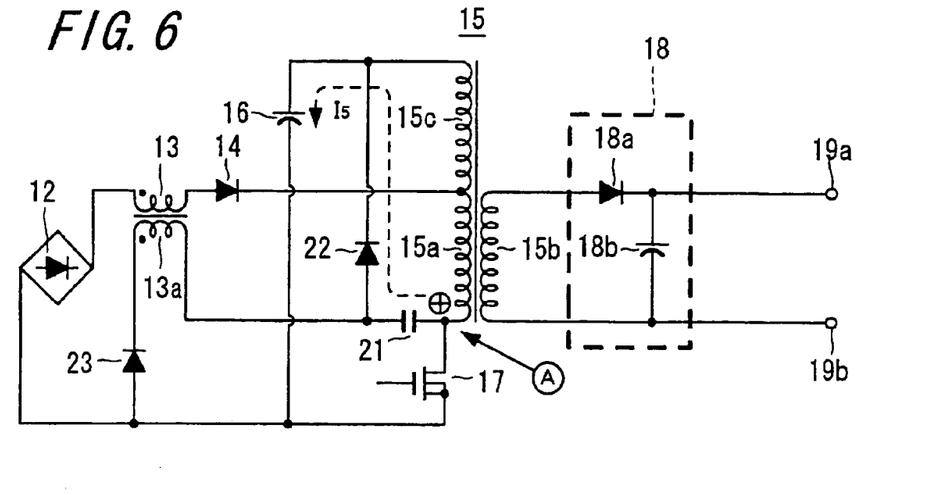
FIG. 6 is a diagram to be used for explaining FIG. 5.

In the power supply circuit shown in FIG. 5, a current $I_5$ flowing through a device added to FIG. 2 when the field effect transistor 17 is OFF is shown in FIG. 6. In FIG. 6, a flyback voltage generated in the converter transformer 15 when the field effect transistor 17 is OFF is absorbed by the capacitor 21 and at this time, the capacitor 21 is charged by a current $I_5$ flowing in a route of the primary winding 15a→the capacitor 21→the diode 22→the capacitor 16→the negative polarity terminal of the rectifying circuit 12.

In this case, the rising inclination of the voltage becomes loose when the field effect transistor 17 is OFF so that the switching loss in a portion where the current and the voltage overlap is made reduced and at the same time it becomes possible to revive a partial energy of the flyback voltage of the converter transformer 15 into the capacitor 16.

Figure 7:
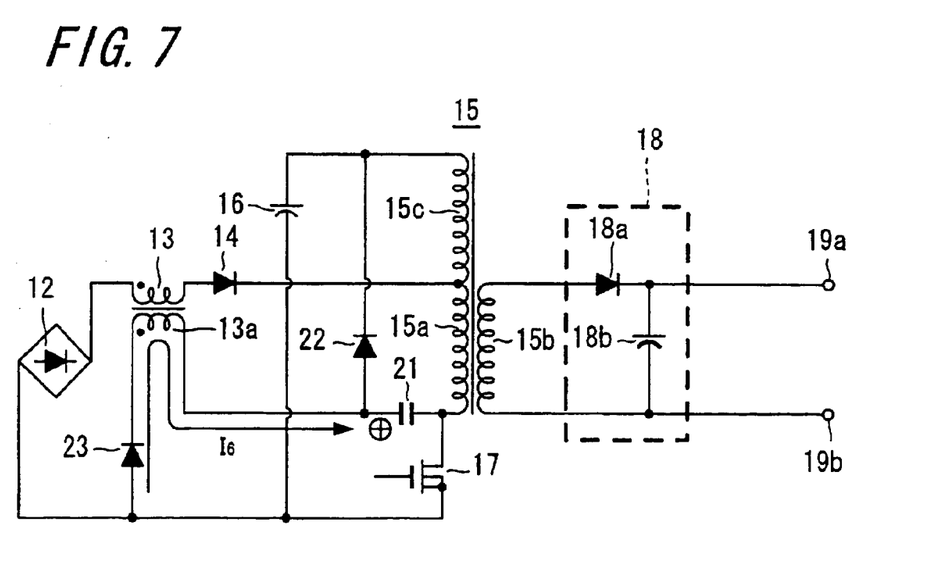
FIG. 7 is a diagram to be used for explaining FIG. 5.

Also, in the power supply circuit shown in FIG. 5, a current $I_5$ flowing through the device added to FIG. 2 when the field effect transistor 17 is ON is shown in FIG. 7. In FIG. 7, when the field effect transistor 17 is ON, a current $I_6$ caused by a charge charged in the capacitor 21 flows in a route of the capacitor 21→the field effect transistor 17→the diode 23→the coupling coil 13 a of the choke coil 13→the capacitor 21 such that the capacitor 21 is reverse biased. In this manner, the status becomes the same as the initial stage when the field effect transistor 17 is next made OFF.

In the example of FIG. 5, the switching loss when the field effect transistor 17 is OFF is made reduced and at the same time it becomes possible to revive energy of the flyback voltage of the converter transformer 16 into the capacitor 16.

It can be easily understood that a similar operational effect can be obtained in such an example of FIG. 5 as in the example of FIG. 2.

Further, in the example of the present invention, the power supply circuit such as shown in FIG. 2 and FIG. 5 is used in an electronic apparatus utilizing a relatively large electric power, for example, in a range of 100 W or more. In this case, the power supply circuit is good in efficiency, so that it is possible to achieve making a power saving in this electronic apparatus. It should be noted that the present invention is not limited by aforementioned embodiments and other various constitutions can be adapted without departing from the scope of the present invention.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A power supply circuit comprising:
a series circuit of a choke coil connected to one terminal of a DC power supply from which a pulsating flow is obtained and a first diode;
a converter transformer having a primary winding, an auxiliary winding which is serially connected to said primary winding and wound in phase therewith and a second winding which is wound in counter phase with said primary winding;
a pulse width modulation control circuit; and
a first capacitor,
wherein said one terminal of said DC power supply is connected to a connection mid point of the primary winding and the auxiliary of said converter transformer by means of said series circuit of the choke coil and the first diode, one terminal of the auxiliary winding of said converter transformer is connected to the other terminal of said DC power supply through said first capacitor and at the same time the other terminal of said primary winding is connected to the other terminal of said DC power supply through a switching device, said secondary winding of said converter transformer is connected to a DC voltage output terminal through a rectifying circuit, said DC voltage output terminal is connected to an input side of said pulse width modulation control circuit, and an output terminal of said pulse width modulation circuit is connected to a control electrode of said switching device.

2. A power supply circuit according to claim 1, wherein a connection mid point of said primary winding and the switching device is connected to one terminal of the auxiliary winding of said converter transformer by means of a series circuit of a second capacitor and a second diode; and at the same time the other terminal of said DC power supply is connected to a connection mid point of said second capacitor and said second diode by means of a series circuit of a third diode and a coupling coil wound in phase on said choke coil.

3. An electronic apparatus using a relatively large electric power, wherein the power supply circuit according to claim 1 or 2 is provided therein.

* * * * *